Sept. 14, 1954
S. DECHER ET AL
2,688,841
CONTROL DEVICE FOR GAS TURBINE PROPULSION PLANTS
Filed Jan. 27, 1948
5 Sheets-Sheet 1

Inventors
Siegfried Decher
Wolfgang Stein
by Stevens, Davis & Miller
their attorneys Patented Sept. 14, 1954

2,688,841

UNITED STATES PATENT OFFICE 2,688,841

CONTROL DEVICE FOR GAS TURBINE PROPULSION PLANTS

Siegfried Decher and Wolfgang Stein, Decize, France, assignors to Hermann Oestrich, Decize, France Application January 27, 1948, Serial No. 4,594

Claims priority, application France February 6, 1947

9 Claims. (Cl. 60—35.6)

This invention relates to the regulation of reaction motors, and more particularly of such motors adapted for jet propulsion or screw propulsion and comprising a motor unit consisting of a compressor, a combustion chamber and a gas turbine.

In the regulation of such motors, particularly those for the propulsion of aircraft, it is necessary to endeavor to maintain constant the load on the motor unit, the power output of this motor unit varying according to the atmospheric and flight conditions.

While it is relatively easy to obtain, by simple means, satisfactory regulation of the R. P. M. with a view to keeping the motor load constant, it is on the contrary very difficult to keep the temperature of the combustion chamber constant.

For this purpose attempts have already been made to measure and regulate directly the temperature of the combustion chamber by means of a temperature regulator. The following difficulties were encountered:

(1) The difficulty of measuring the temperature corresponding to the amount of the heat used.

(2) Insufficient fidelity of the thermostat.

(3) Inertia of the temperature regulator.

For these reasons this temperature regulating installation is not sufficiently reliable.

The object of the present invention is to remedy this disadvantage.

In the method of regulation proposed by this invention, the temperature of the combustion chamber is not directly measured, but instead there are measured and used for regulating purposes other quantities which, while standing in definite relationship to this temperature, are capable of being measured with greater ease, certainty and precision and involve a minimum of inertia.

The method, according to this invention, of regulating reaction motors of the kind hereinbefore set forth and wherein the rotational speed of the motor is kept substantially constant for any given load, irrespectively of external conditions, consists in regulating the temperature of the combustion chamber in dependence upon the variations of fuel consumption and upon a pressure difference between two points of the compressor.

This method is based on the recognition of the fact that the amount of fuel B delivered to the injection nozzle or nozzles and the pressure difference $\Delta p$ between two points of the compressor are related by the equation:

(1) $$B = K_1 + K_2 \Delta p$$

wherein $K_1$ and $K_2$ are constants.

In this manner the difficult and inaccurate measurement of a temperature is avoided and replaced by the easier and more reliable measurement of a fluid flow (B) and of a pressure difference ($\Delta p$).

In carrying the invention into effect, in motor units comprising regulable propulsion cones (variable cross-section jets) or regulable propulsion screws (variable pitch propellers), the regulation of the rotational speed of the motor to keep the same substantially constant may be effected by varying the fuel supply to the injection nozzle or nozzles in the combustion chamber, while regulation of the temperature of the combustion chamber may be effected by varying the propulsion means (cone or screw) in dependence upon the variations of the factors B and $\Delta p$.

Owing to the interdependence of the factors B and $\Delta p$ in accordance with the foregoing Equation 1, there are actually two modes of carrying the invention into effect:

According to one mode, the rotational speed of the motor is kept substantially constant by means of a speed regulator controlling the fuel supply, while the temperature of the combustion chamber is regulated by controlling the propulsion means in dependence upon the factors B and $\Delta p$, as already stated.

According to another mode, the rotational speed of the motor is kept substantially constant by means of a speed regulator controlling the propulsion means, while the fuel supply, is regulated in dependence upon the factors B and $\Delta p$.

The underlying considerations by which the foregoing Equation 1 is arrived at will now be explained, the symbols used in the explanation which follows having the meanings respectively assigned to them therein and as under:

$B$ = the quantity of fuel consumed per second.
$\Delta p$ = a pressure difference between two points of the compressor.

$K_1$ = a constant which is characteristic of each individual motor unit and which is determined by the reduction in power output consequent upon a given decrease in the external pressure.

$K_2$ = a constant which is made up of a combination of several constituent constants, such as the effective cross-section of the first stage of the turbine, the pressure prevailing in the combustion chamber, and the calorific value of the fuel used.

$G_1$ = the weight of the air admitted for combustion.

$T_2$ = the absolute temperature at the delivery end of the compressor.

$T_3$ = the temperature of the combustion chamber, regarded as a hypothetical constant.

$P_2$ = the pressure at the delivery end of the compressor.

$\beta$ = a combination of various constants.

$\gamma$ = a combination of various constants.

It may be observed that, as will be appreciated, the rotational speed of the motor and the factors $K_1$ and $K_2$ are not in actual practice maintained absolutely constant, and allowance must be made for variations within certain limits, the extent of such variations depending on the nature, type, design or construction of the motor unit.

The amount B of fuel necessary to heat the air in the combustion chamber of a motor unit is represented by the equation:

$$(2) \qquad B = K_1 + \beta G_1 T_3 \left(1 - \frac{T_2}{T_3}\right)$$

The quantity of air $G_1$ supplied for combustion may be calculated by reference to the pressure difference $\Delta p$ in the compressor in accordance with the following formula:

$$G_1 = \frac{\lambda}{\sqrt{T_3}} \cdot \frac{P_2}{\Delta p} \cdot \Delta p$$

Substituting this value for $G_1$ in Equation 2 above, one obtains:

$$(3) \qquad B = K_1 + K'_2 \frac{1 - \frac{T_2}{T_3}}{\frac{\Delta p}{p_2}} \cdot \Delta p$$

wherein $K'_2$ is a constant representing the combination of constants $\beta$ and $\gamma$ and of the temperature $T_3$ regarded as a constant.

If the expression $$(4) \qquad \frac{1 - \frac{T_2}{T_3}}{\frac{\Delta p}{P_2}} = \alpha = \text{constant}$$

and if we put $K_2 = K'_2 \alpha$, then we obtain the Equation 1 hereinbefore set forth, namely:

$$B = K_1 + K_2 \Delta p$$

The Equation 3 above establishes between $T_3$, $\Delta p$ and B the relation which enables measurement of use of $T_3$ for regulating purposes to be replaced by the easier ones of $\Delta p$ and B.

Such pressure differences are encountered in the compressor, for example between the stages or groups of stages thereof, whilst the value of $\gamma$ as defined above by the Equation 4 remains nearly constant regardless of the temperature of the air entering the compressor.

In these particular cases, the partial differences of pressure between these stages or groups of stages satisfy the Equation 1 hereinbefore set forth.

If the direct measurement of a pressure difference $\Delta p$, either between the inlet and delivery ends or between given stages of the compressor, should present too much difficulty, part of the air may with advantage be branched off and the pressure difference measured at the branch conduit constriction.

This invention also comprises apparatus for carrying out the methods hereinbefore set forth or analogous methods, such apparatus being characterized by the provision of a fuel supply control device for regulating the fuel supply so as to maintain the motor speed constant, means for measuring the fuel supply (B), means for measuring the pressure difference ($\Delta p$) between two points of the compressor, and control means adapted to be operated by both said measuring means to regulate the propulsion means of the motor unit, e. g. by varying the propeller pitch or the opening (cross-section) of the jet propulsion cone.

In order to cause said fuel control device to regulate the fuel supply so as to maintain the motor speed constant, a speed regulator, such as the well-known ball-type centrifugal governor, may be used.

The said means for measuring the fuel supply may comprise a restriction arranged in the fuel supply conduit leading to the injection nozzle or nozzles.

The said means for measuring the pressure difference may comprise a system of bellows.

According to another embodiment of the invention applied to a motor unit comprising jet propulsion means, the regulating apparatus is characterized by the provision of a device for regulating the opening of the propulsion cone, a speed governor driven by the motor acting on said regulating device, and means for regulating the supply to the injection nozzles, said means being operated on the one hand in dependence upon the values of the fuel supply (B) and, on the other hand, of the pressure difference ($\Delta p$) in the compressor.

According to a further feature of this invention, the apparatus comprises a fuel distributing device which measures and regulates the amount of fuel passing to the injection nozzles and is moved by the speed regulator.

In accordance with yet another feature of the invention, the injection nozzles of the reaction motor have two fuel supply lines: one in which the fuel is brought up to the injection nozzles at a constant rate of flow irrespectively of the number of revolutions of the motor, this supply constituting the "basic" supply and, the other, constituting a "make up" supply, wherein the fuel is brought up to the injection nozzles at a variable rate of flow depending on the number of revolutions of the motor, the "basic" supply corresponding for example to the smallest load and to flight at great altitude.

This invention also covers a particular form of the apparatus referred to especially for use with heavy fuels, which is characterized by an auxiliary fuel supply line for starting, through which an auxiliary starting fuel is passed by means, such as an electric pump, the speed of which is independent of that of the motor, this auxiliary line supplying the "basic" and "make up" lines for the injection nozzles up to the moment at which the pressure in the last two lines becomes sufficient for combustion to take place under good conditions.

Other feature of the invention and the various possible combinations thereof will be apparent from the following description with reference to the accompanying drawings which show regulating or control device according to this invention by way of example only and for the purpose of enabling the nature of the invention, and the manner of carrying it into effect to be more clearly understood.

Figure 3:
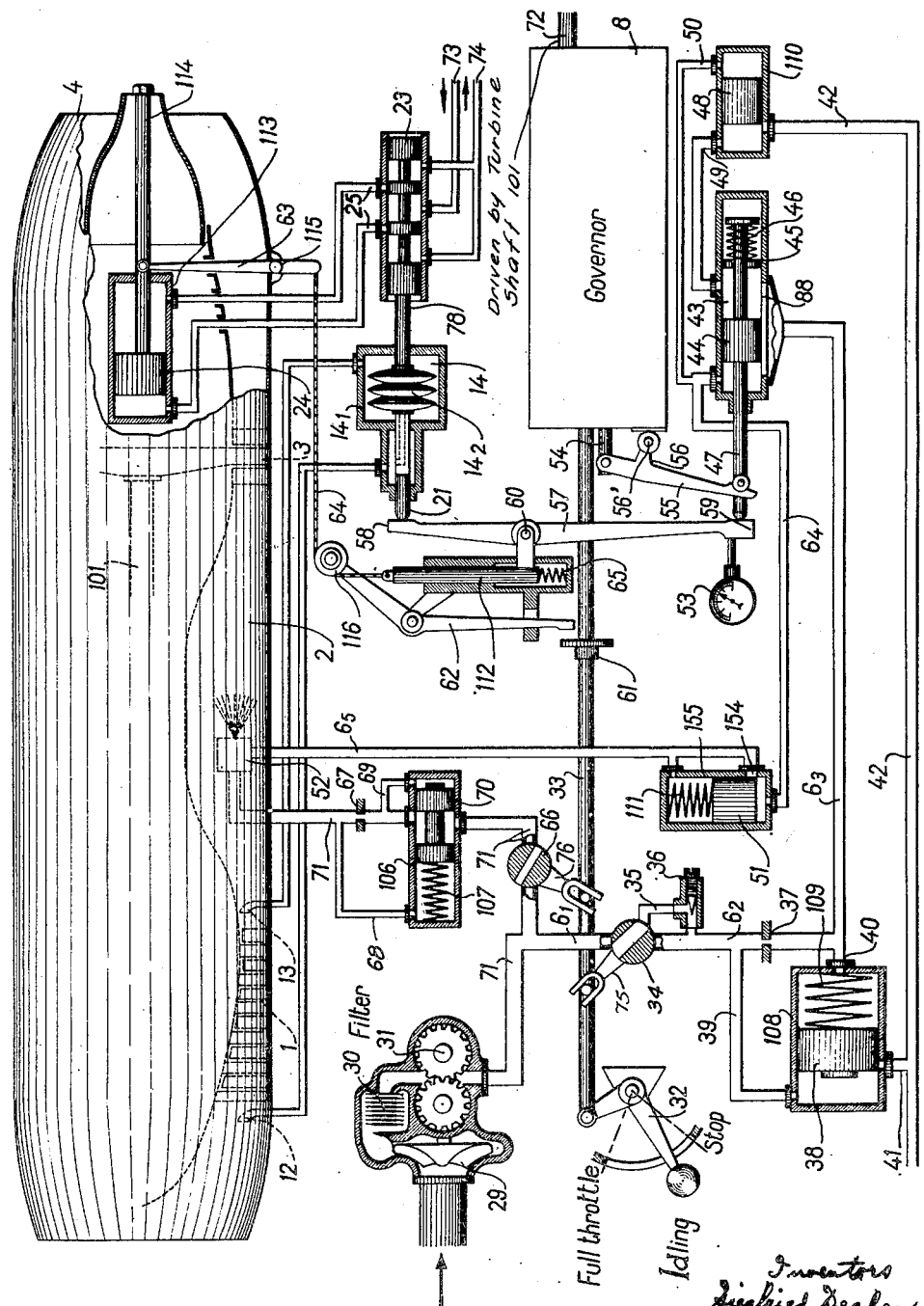

Fig. 3 regulating arrangement diagrammatically represents a modified form of regulating apparatus.

Figure 4:
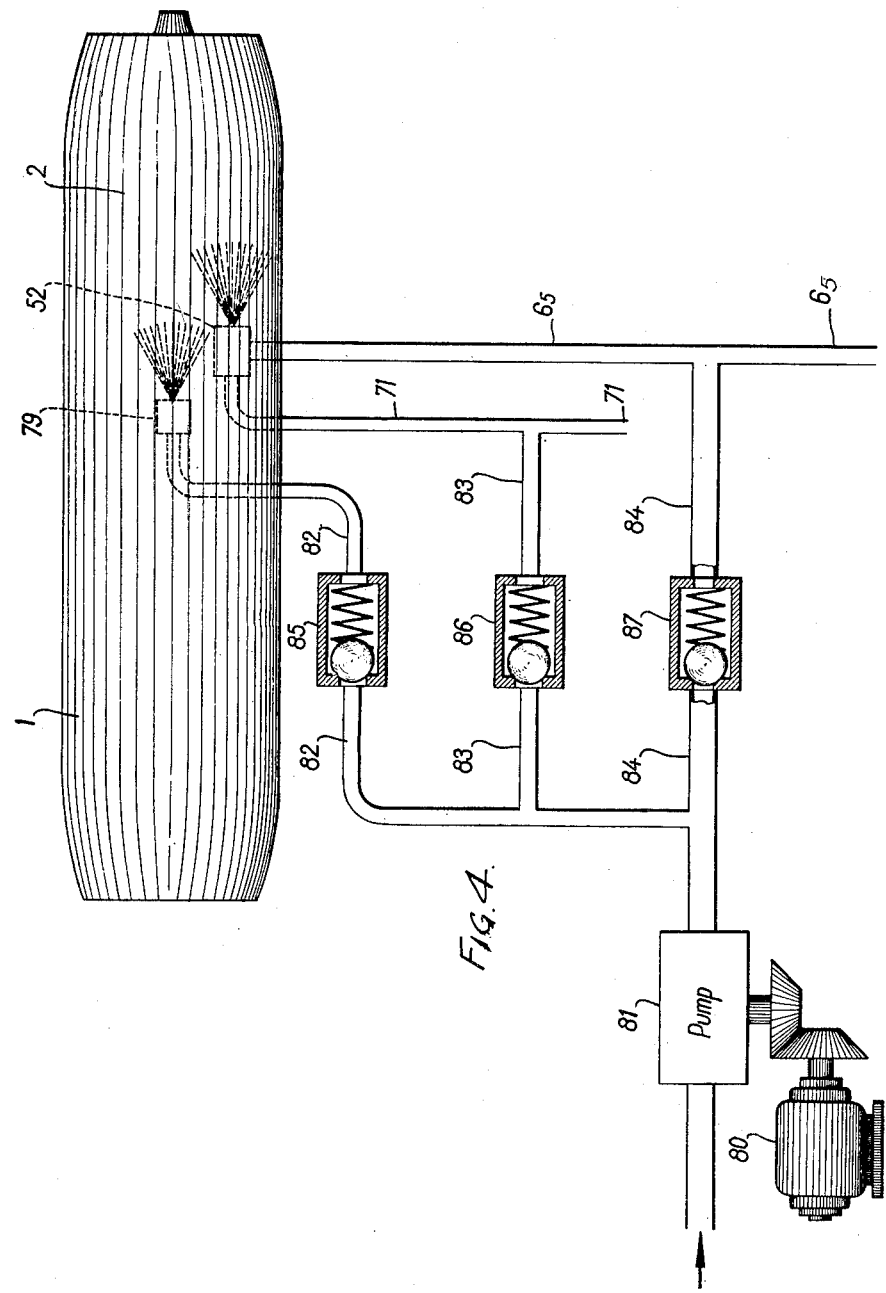

Fig. 4 is a diagrammatic representation of an auxiliary fuel supply system.

Figure 5:
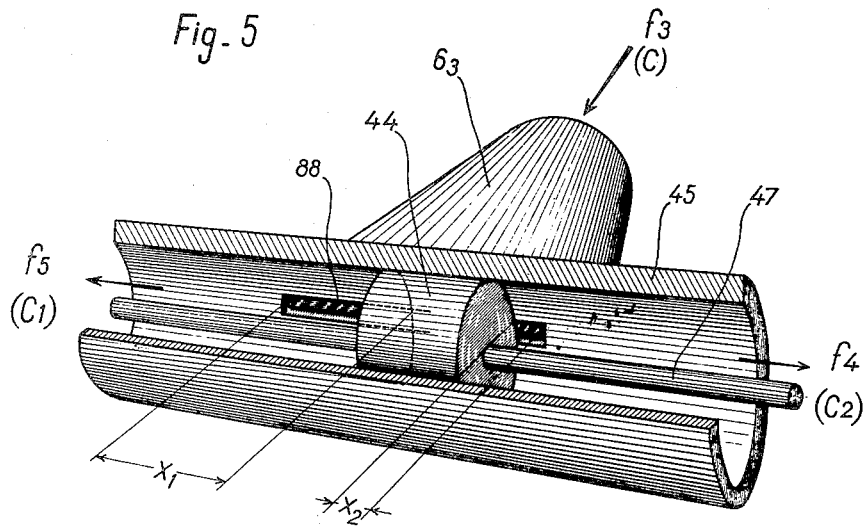

Fig. 5 is a perspective view of a fuel distributor.

Figure 6:
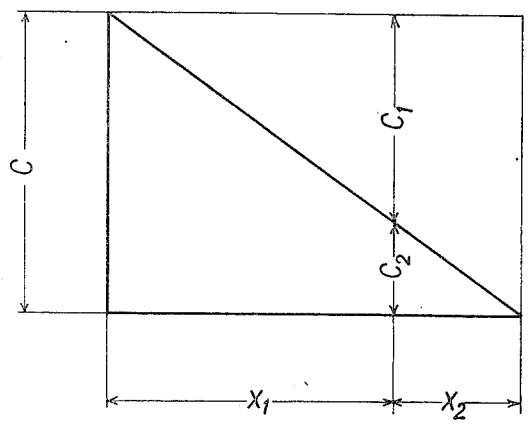

Fig. 6 is a diagram showing the manner of operation of this distributor.

Figure 1:
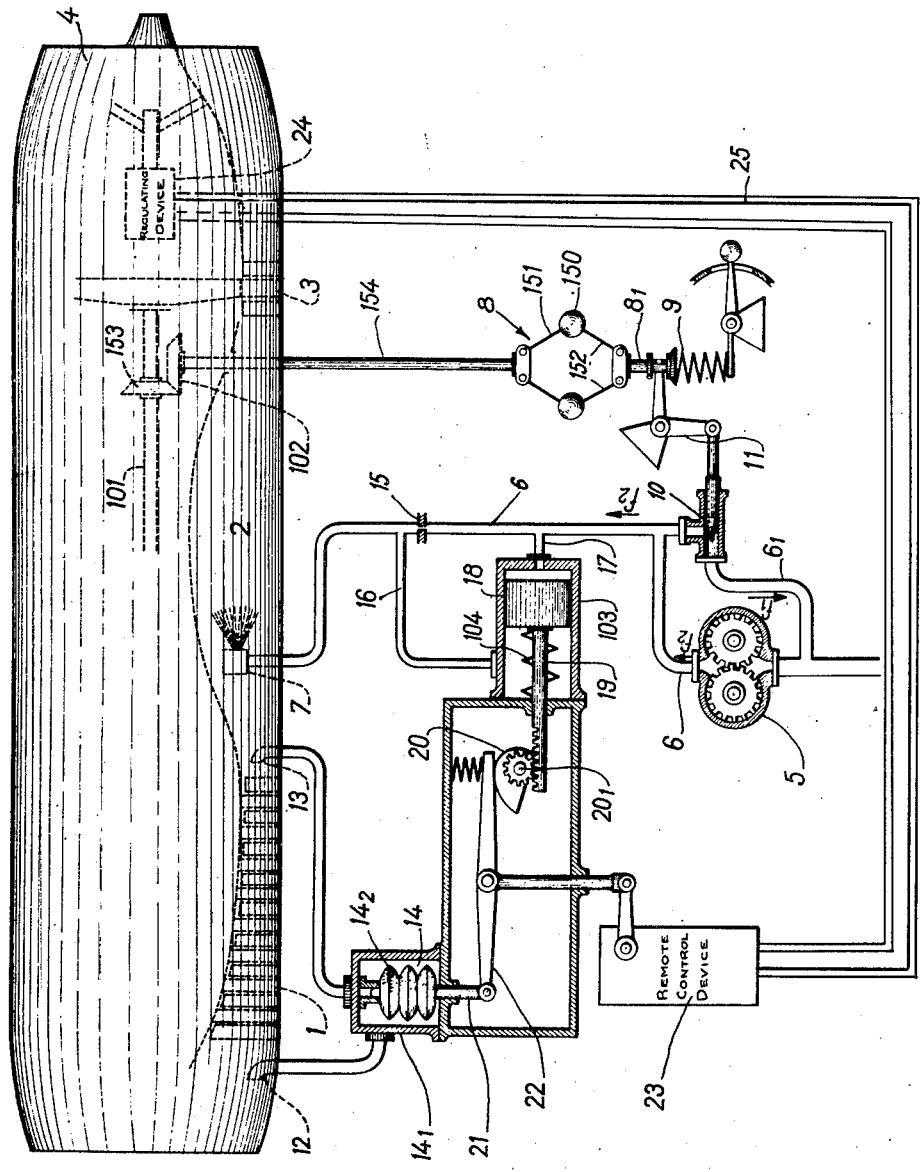
Fig. 1 is a diagrammatic representation of an apparatus for regulating the number of revolutions by variation of the fuel admission, the temperature of the combustion chamber being maintained constant by variation of the cross-section of the propulsion cone.

The motor unit shown in Fig. 1 comprises a compressor 1, a combustion chamber 2, a turbine 3 (which are partly shown in dotted lines) and a propulsion cone 4. These elements placed one after the other are only shown in semi-section, the part which is not shown being symmetrical with the part shown.

The fuel is caused to flow by the pump 5 and is conducted through the pipe 6 to the injection nozzles 7. Keyed on the shaft 101, which is common to the compressor 1 and to the turbine 3, is a bevel gear 153 which drives a centrifugal governor 8.

The centrifugal governor 8 may be of any known construction.

The centrifugal governor is diagrammatically illustrated in the showing as comprising a pair of balls 150 and two pairs of pivotally mounted links 151, 152 between said balls and the opposite ends of a shaft 154 and an axially slidable member 8₁, a bevel gear 102 meshing with bevel gear 153 being keyed on shaft 154 to transmit drive thereto from shaft 101.

The slidable member 8₁ of the centrifugal governor 8 is subjected to the action of a spring 9 the force of which can be adjusted to set the governor so as to keep the speed constant at the desired R. P. M.

The slide 8₁ of the centrifugal governor 8 actuates, through a system of levers 11, a fuel supply control device 10, such as a needle valve arranged in a fuel conduit 6₁ termed a return conduit and arranged to by-pass the fuel pump 5.

The amount of fuel supplied by the pump 5 through the conduit 6 to the nozzles 7 will thus be regulated differentially in dependence on the flow which returns by the return conduit 6₁, that is to say in dependence on the speed of the compressor 1 and of the turbine 3.

Arranged at the inlet and delivery ends of the compressor 1 are two pressure branching-off devices, e. g. air intakes 12, 13. The intake 12 at the inlet end communicates with the casing 14₁ of a pressure differential device 14, while the intake 13 communicates with the interior of the deformable element 14₂ disposed inside the casing 14₁.

The element 14₂ is deformed in dependence on the pressure difference $\Delta p$ between the inlet and delivery ends of the compressor 1 and these deformations are transmitted by the stem 21 and a balance rod 22 to a remote control device 23 operating the device 24 which varies the cross-section of the propulsion cone 4. The remote control device may be any fluid servo-motor of approved type from which starts a pressure fluid line 25 for pneumatically or hydraulically controlling the cone moving device 24.

The balance rod 22 has a variable fulcrum or support constituted by a cam 20 the rotation of which is produced through the medium of a pinion 20₁ and a rack 19 by a piston 18 capable of being displaced in a cylinder 103 against the action of spring 104.

The ends of the cylinder 103 communicate with the fuel supply conduit 6 by means of two conduits 16, 17. Between the points of connection of these conduits 16 and 17 with the conduit 6, the latter is provided with a restriction 15. The difference of pressure across this restriction 15 is a function of the rate of flow B of fuel in the conduit 6 and the two pressures are transmitted through the conduits 16, 17 to opposite sides of the piston 18 which is thus displaced in dependence on the fuel flow B.

The support for the balancing rod 22 constituted by the cam 20 operated by the piston 18 therefore also varies in dependence on B.

The form of the cam 20 must be such that the pressure difference across the restriction 15, being a function of the fuel flow B, may have the same effect upon the regulation of the jet cone 4 as a pressure difference $\Delta p$ at the compressor has when related to B by Equation 1.

$$B = K_1 + K_2 \Delta p$$

The manner of operation of this arrangement is as follows:

By varying the tension of the spring 9 the speed of the shaft 101 is first set to a predetermined value. If this shaft 101 exceeds the speed for which the centrifugal governor 8 has been set, the latter operates through the medium of the levers 11, the fuel regulating device 10 in the return conduit 6₁ to alter the amount of fuel supplied to the injection nozzles 7 through the conduit 6.

For instance, if the speed of the shaft 101 drops below the predetermined speed, the slide 8₁ of the governor 8 will fall, causing the fuel regulating device 10 to move in the closing direction. The amount of fuel returning through the conduit 6₁ in the direction of the arrow $f_1$ will decrease and, the amount of fuel flowing in the conduit 6 in the direction of the arrows $f_2$, will increase. The nozzles 7 will be more abundantly fed with fuel which will increase the speed of the turbine 3 and consequently that of the compressor 1.

The difference $\Delta p$ between the pressure at the inlet end and that at the delivery end of the compressor is shown by a more or less considerable deformation of the bellows 14₂ which is transmitted to the balance rod 22 by the stem 21.

On the other hand the pressure difference between the conduits 16 and 17 is a function of the rate of flow of the fuel through the restriction 15 and is shown in turn by a position of equilibrium of the piston 18 in the cylinder 103. Any variation of this rate of flow B will be made evident by a displacement of the piston 18 which through the rack 19 and the pinion 20₁ will cause the cam 20 to rotate and will produce a displacement of the point of support of the balancing rod 22. The values of the rate of flow B and of the pressure difference $\Delta p$ must always be related by the Equation 1:

$$B = K_1 + K_2 \Delta p$$

which presupposes constant temperature of the combustion chamber.

If this temperature varies the terms B and $\Delta p$ are no longer related by the Equation 1 and the displacements communicated to the balance rod 22 by the lever 21 and the cam 20 will have the effect of influencing the control device 23 which, through the medium of the regulating device 24, will modify the position of the propulsion cone 4. This alteration of the position of the cone 4 will result in a variation of the temperature of the combustion chamber restoring it to the desired value.

For example, if the temperature of the combustion chamber exceeds the permitted value, the displacement of the balance rod 22 will produce a greater opening (i. e. enlargement of the cross-section) of the propulsion cone 4 which in turn will reduce the temperature of the combustion chamber to the desired value.

If, on the contrary, the temperature of the combustion chamber is too low, a reduction of the opening of the cone 4 will cause the desired temperature in the combustion chamber to be re-established.

Figure 2:
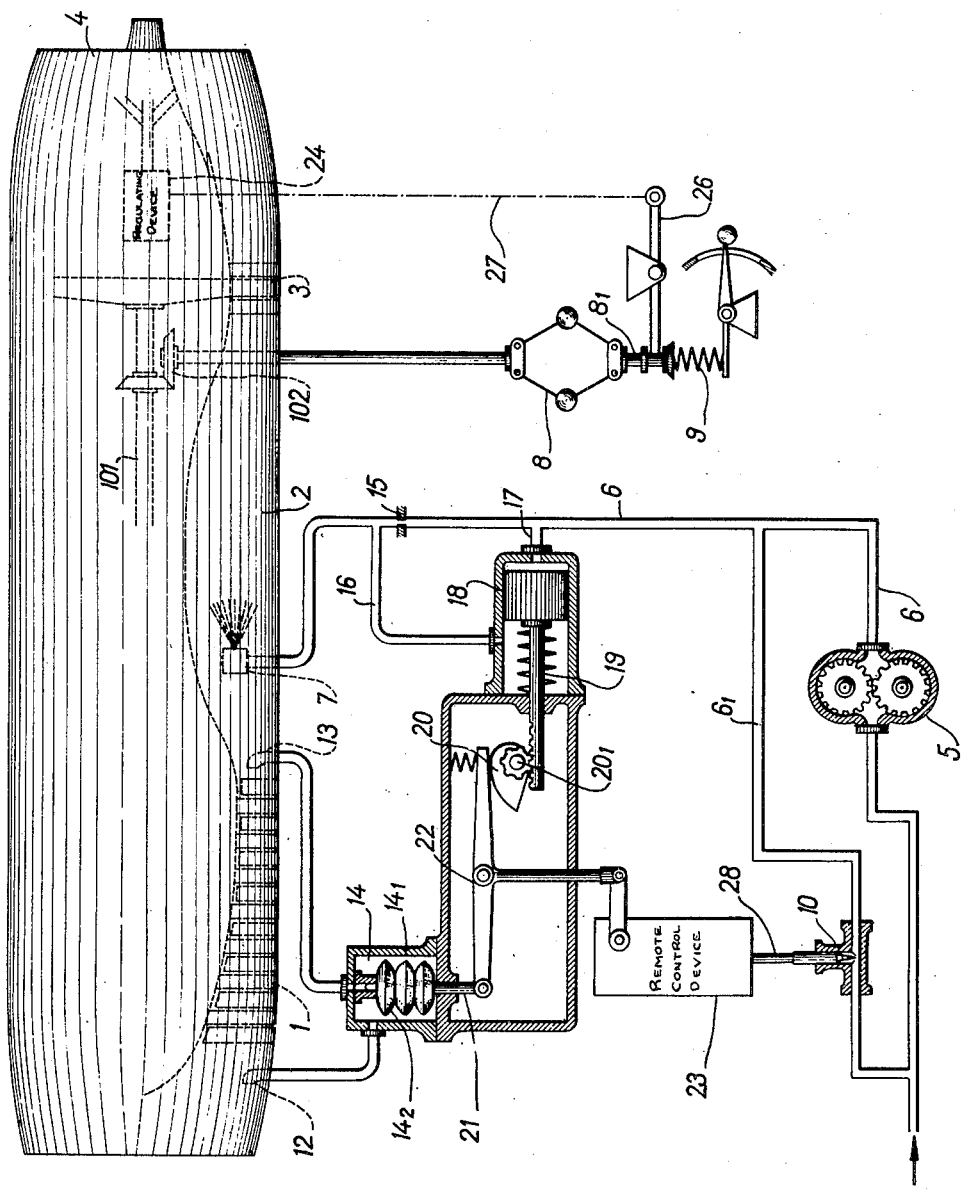
Fig. 2 is a diagrammatic representation of an apparatus for regulating the number of revolutions by variation of the cross-section of the propulsion cone, the temperature of the combustion chamber being regulated or kept constant by variation of the fuel admission.

The diagram of Fig. 2 shows another embodiment of the regulating apparatus.

In this case the centrifugal governor 8 does not as in the preceding case operate the device 10 for regulating the fuel supply but, through a lever 26 and a rod 27, acts on the mechanism 24 for regulating the opening of the propulsion cone 4.

Also, the remote control device 23 operated by the balance rod 22 does not control the mechanism for regulating the opening of the propulsion cone 4, but acts on the fuel supply regulating device 10 in the return conduit 6₁.

This regulating apparatus operates as follows:

If the speed of the shaft 101 of the turbine 3 and of the compressor 1 becomes too high, the governor 8 varies the opening of the propulsion cone 4 in the sense of reducing its cross-section, thereby reducing the speed of the turbine 3.

If the temperature of the combustion chamber deviates from the predetermined constant value the Equation $B = K_1 + K_2 \Delta p$ is no longer true and the balance rod 22 is displaced and operates the control device 23 which varies the fuel flow B through the medium of the fuel regulating device 10 until the temperature of the combustion chamber again assumes the predetermined value.

Fig. 3 illustrates diagrammatically another mode of carrying this invention into effect.

In this embodiment the motor unit still comprises the essential elements of compressor 1, combustion chamber 2, turbine 3 and propulsion cone 4.

The injection nozzles 52 in the combustion chamber 2 have in this case a double supply viz:

(a) A constant supply of fuel through a conduit 71 termed basic supply, which is invariable irrespective of the operating conditions at any time and independently of the speed of the shaft 101. This amount of fuel corresponds for example to the fuel consumption of the motor unit when the partial load is minimum and in the case of flight at high altitude.

This "basic" supply is forced through the conduit 71 by means of a pump aggregate comprising a low pressure centrifugal pump 29, a filter 30 and a high-pressure gear pump 31. Arranged across the supply conduit 71 is a fuel supply regulating device constituted by a piston 70 movable in a cylinder 106 and subjected to the action of a spring 107.

The two opposed faces of the piston 70 are subjected through the conduits 68, 69 to the pressures prevailing in the conduit 71 on either side of a restriction 67.

Also arranged in the conduit 71 is a rotary regulating valve 66 operated by a lever 76.

(b) A variable fuel supply through the conduits 6₁, 6₂, 6₃, 6₄, 6₅. The conduit 6₁ is branched off the conduit 71 between the pump aggregate 29, 30, 31 and the valve 66 and terminates in a rotary distributor valve 34 actuated by a lever 75. This distributor valve 34 may occupy three positions:

(1) A position in which it shuts off the conduit 6₁.

(2) A position of idle running (the position shown in the drawing) wherein the fuel proceeding from the pumps is conducted into a bypass 35 provided with a needle valve 36 for regulating the flow past which the fuel flows into the conduit 6₂.

(3) An open position in which the distributor valve 34 establishes direct communication between the conduit 6₁ and the conduit 6₂ for variable flow.

According to the desired supply of fuel, i. e. the desired output of the motor, the distributor valve 34 may occupy any intermediate position between those mentioned at (2) and (3).

The conduit 6₂ is separated from the fuel supply conduit 6₃ by a restriction 37 of a pressure and flow stabilizer. The pressures on either side of this restriction are transmitted by conduits 39, 40 to the two opposed faces of a piston 38 moving in a cylinder 108 against the action of a spring 109. This piston 38 itself serves as a regulable valve for a pipeline 41 connecting the conduit 6₂ with a general return conduit 42 terminating in the fuel tank.

According to the rate of flow of fuel past the restriction 37 a varying amount of fuel flows into the general return conduit 42 thereby varying by differential action the supply of fuel into the conduit 6₃ in the desired manner.

The amount of fuel passing into the supply conduit 6₃ and thence into a distributor 45 is thus stabilized by this arrangement. This amount corresponds to the greatest fuel consumption of the motor unit when the R. P. M. and the pressure are maximum, which occurs in high-speed flying, flight at low altitude, or in very cold weather.

However, it may happen that the fuel supply by the pump 31 does not attain the necessary maximum amount. In that case the piston 38 closes the conduit 41.

The distributor 45 comprises a flow distributing member constituted by a piston 44 moving in a cylinder 43 at the center of which terminates the fuel supply conduit 6₃. The piston 44 has a piston rod 47 passing through both ends of the cylinder and having one end acted upon by an external spring 46.

The piston 44 distributes the fuel, which is admitted to the cylinder 43 through the conduit 63, between two outgoing conduits each connected at one end of this cylinder.

The first of these is a conduit 49 communicating with the general return conduit 42 through the medium of a compensating valve.

This compensating valve, in the example of Fig. 3, is constituted by a cylinder 110 the ends of which communicate through the conduits 49, 50 with the ends of the cylinder 43 and which contains a piston 48 to form a regulable valve for the return conduit 42.

Cylinder 43 has a fuel inlet longitudinal slot 88 (see also Fig. 5 to be described later on) through which the incoming fuel is admitted to the spaces in cylinder 43 on either side of piston 44 as two separate flows, one of which will be delivered from the left-hand space to conduit 64 and the other one from the right-hand space to return pipe 42 via compensating cylinder 110, the last-named flow being controlled by compensating valve 48.

The other outgoing conduit from the cylinder 43 is the conduit 64, conveying the fuel to the conduit 65 and thence to the injection nozzle 52 through the medium of a valve 51 loaded by a spring 111, the purpose of this valve being to maintain a pressure in the distributor 45 high enough to provide for the return of fuel to the conduit 42 at any time. Valve 51 is movable in a cylinder 155 supplied with fuel from pipe 64 and delivering fuel to pipe 65 through an outlet port 154 controlled by said valve.

The governor 8 driven by a shaft 72 connected to the shaft 101 (through a connection which is not shown for the sake of simplicity) acts through the medium of levers 54, 55, 56 upon the rod 47 of the distributor piston 44 and thus regulates the position of the latter in such manner that the amount of fuel conducted to the injection nozzle 52 through the conduits 64, 65 is varied so as to tend to re-establish the desired speed.

The system of levers 54, 55, 56 constitutes a variable reduction gearing such that, when the fuel consumption is low, it produces smaller variations in the fuel supply than when the consumption is large, in which case greater variations are effected per unit of travel of the rod 54.

For that purpose, the short lever arm 56 has a roller 56' rotatably borne thereon, which is adapted freely to roll on a face of the casing of governor 8 as shown.

The rod 47 of the distributor piston 44 is in engagement with a balance rod 57 articulated at 60 to a slide block 112 and having its other end acted upon by the pressure differential mechanism which will be described hereinafter.

A dial indicator 53 in contact with the balance rod 57 and arranged in line with the rod 47 indicates at any instant the supply of fuel to the injection nozzles 52.

The pressure differential mechanism 14 comprises, as the mechanism of Figs. 1 and 2, a casing 14₁ communicating with the air intake 13 placed at the delivery end of the compressor 1 and a bellows 14₂ the interior of which communicates with the air intake 12 placed at the front of the compressor.

The displacements of distributor piston 44 are transmitted through rod 47 to the end 59 of lever 57 which rocks about fulcrum 60 to impart a corresponding displacement through the opposite end 58 of said lever to push rod 21, and the displacements of said push rod in combination with deformations of bellows 14₂ in dependence on the difference of pressure $\Delta p$ are transmitted to a push rod 78 to move a piston in the control device 23 which operates the mechanism 24 for regulating the opening of the propulsion cone 4.

In the example of Fig. 3, the control device 23 acts by means of oil under pressure upon a piston 24 capable of displacement in a cylinder 113 connected to the control device 23 through conduits 25.

The piston 24 is fast with a piston rod 114 operatively connected with the propulsion cone 4. The oil is supplied to the device 23 by a conduit 73 and returned therefrom by a conduit 74.

The displacements of the propulsion cone 4 are transmitted by a lever 63 pivotally supported at 115 and a cable 64 connected to the outer end of lever 63 and to the slide block 112 to which the balancing rod 57 is pivoted and which is under the action of a spring 65.

The cable 64 passes over a pulley 116 carried by a lever 62.

Finally a control lever 32, through the medium of a link 33 actuates:

(1) The regulating mechanism of the valve 66 by means of an operating lever 76, (2) The distributing valve 34 by means of an operating lever 75, (3) An abutment member 61 for the lever 62 which carries the movable pulley 116, (4) The means (which are not shown but are the same in principle as those diagrammatically illustrated as a spring 9 in Fig. 1) for setting the governor 8, so as to cause it to maintain the R. P. M. corresponding to the desired speed.

In the position shown in full lines in Fig. 3, the control lever 32 is set for idle running. Its two extreme positions "stop" and "full speed" are indicated by the broken lines.

The regulating apparatus shown in Fig. 3 works as follows:

If the speed of the shaft 101 common to the compressor 1 and to the turbine 3 deviates from the predetermined speed, the governor 8, through the medium of levers 54, 55, 56, causes the distributor 45 to alter the amount of fuel passed into the return conduit 42 by the conduit 49, thus differentially varying the amount of fuel supplied to the injection nozzles 52 and thereby varying the speed of the turbine 3 so as to re-establish the predetermined speed.

The rate of flow B of the fuel supplied to the injection nozzles 52 is determined and indicated by the position of the distributor piston 44, that is, by the position of the end 59 of the balance rod 57 and also by the end 58.

On the other hand, the pressure difference $\Delta p$ between the inlet and delivery ends of the compressor is indicated by the actual length of the combined members 21, 14₂ and 78.

If the quantities B and $\Delta p$ do not satisfy the Equation 1

$$B = K_1 + K_2 \Delta p$$

that is, if the temperature in the combustion chamber has deviated from the predetermined temperature, the deformation of the bellows 14₂ and the displacement of the rod 47 will be transmitted through the rod 78 to the control device 23 which, through the mechanism 24, will alter the opening of the propulsion cone 4, and such alteration will in turn restore the temperature of the combustion chamber to the predetermined value.

The displacement of the propulsion cone 4 will in its turn bring about, through the lever 63 and the cable 64, a displacement of the slide block 112, thus moving the pivot 60 or the balance rod 57, which will damp oscillations of the regulating device.

Operation of the lever or acceleration control 32 causes, through the link 33, the governor 8 to be set to the desired speed.

At the same time the lever 32 acts through the levers 75 and 76 upon the valves 34 and 66 respectively.

Operation of the valve 66 shuts off or gives a fixed value to the "basic" fuel supply reaching the nozzles 52 through the conduit 71.

Operation of the valve 34 on the other hand, varies the "make-up" fuel supply reaching the nozzles 52 through the distributor 45.

It should be understood that valves 34 and 66 are so arranged as to have no longer any influence on the rate of flow after they have been moved past the idle run position towards full speed position.

If the acceleration control lever 32 is operated beyond the "full speed" position, the abutment member 61 of the link 33 will displace the layer 62 and the pulley 116 which it carries, the resulting pull upon the cable 64 producing displacement of the slide block 112, to move the pivot point 60 of the balance rod 57. In this way the ratio of the arms of the balance rod is altered consistently with the large temperature increase consequent upon the excessive charge corresponding to this position of the acceleration control.

The device including the pistons 70 and 38 are pressure stabilizers, the manner of operation of which has already been explained.

Fig. 4 shows another embodiment of this invention designed especially for the case of operation of the motor unit with heavy fuel, with which starting is almost impossible.

In this case the combustion chamber 2 is furnished with a nozzle 52 having a double fuel supply analogous to the arrangement of Fig. 3, and with an additional nozzle 79 having only a single supply and arranged beside the nozzle 52.

The fuel is placed under pressure by a pump 81 driven by an electric motor 80 adapted to work independently of the motor unit.

The delivery conduit of this pump 81 is divided into three secondary conduits constituting the auxiliary line, namely (1) The conduit 82 supplying the nozzle 79 through the medium of a check valve 85, (2) The conduit 83 which is connected through a check valve 86, with the conduit 71 of Fig. 3 (open into conduit 71 at a point between restriction 67 and nozzle 52).

(3) The conduit 84 which is connected through a check valve 87 with the conduit 65 of Fig. 3 (to open into conduit 65 at a point between valve 51 and nozzle 52).

The valves 86 and 87 remain open as long as the pressure in the conduits 71 and 65 is low, that is, as long as the motor unit does not rotate at sufficient speed, and they close as soon as the pressure in the conduits 71 and 65 reaches a value sufficient to ensure adequate combustion of heavy fuel.

Fig. 5 is a perspective view of the fuel distributor diagrammatically illustrated in Fig. 3.

The cylinder 45 in which the distributor piston 44 is displaced is provided with a longitudinal slot 88 which places the interior of the cylinder in communication with the fuel supply conduit 63. According to the position of the piston 44 in the cylinder 45 this slot will be divided into two parts of variable length, the total cross-sectional area remaining constant.

The fuel arriving through the conduit 63 in the direction of the arrow $f_3$ will thus be divided into two portions flowing out at the two ends of the cylinder 45 through the conduits 49 and 64.

If C is the amount of fuel admitted through the conduit 63, $C_1$ the amount passing through the conduit 64 to the injection nozzles 52 and $C_2$ is the amount of fuel returned through the conduit 49 to the general return pipe line 42, the following relation will always apply:

$$C = C_1 + C_2$$

and the ratio $$\frac{C_1}{C}$$

will vary linearly. The linear variation curve is shown in Fig. 6 as a function of the lengths of piston travel $X_1$ and $X_2$ along the longitudinal edges of the slot 88.

In the apparatus hereinbefore described, the restrictions 15 (Fig. 1), 37 or 67 (Fig. 3), will be selected in such manner as to bring about a pressure drop great enough for the viscosity of the fuel (varying with its nature and temperature) to exert no substantial influence upon the measurement. For that purpose it is desirable to employ a diaphragm which has a sharp edge and is adapted to provide a reduction of cross-section less than 0.25.

If injection nozzles with double supply such as 52, Fig. 3 are employed, then the "make-up" supply conduit 65 will be provided with a constriction to reduce its cross-sectional area so that the fuel in line 64 will always be under sufficient pressure; in Fig. 3, the constriction is provided by valve 51 urged by spring 111, in cooperation with the fuel outlet 154 from cylinder 155.

In order that the amount of fuel constituting the make-up supply may be susceptible to regulation down to the smallest values, it is advantageous for the pressure of the fuel in the return conduit 42 to be kept as low as possible.

The regulating apparatus hereinbefore described have many technical advantages, and in particular the following:

(1) They enable the temperature in the combustion chamber to be regulated without necessitating direct measurement of the temperature and its use for regulating purposes, the latter being replaced by measurement of a fuel flow B and a pressure difference $\Delta p$ and utilization thereof for regulating purposes, such measurements of B and $\Delta p$ being easier to effect and giving more precise results than the measurement of a temperature, and their use for regulation of the temperature to be rapidly controlled with a minimum of inertia.

(2) The double supply to the injection nozzle, a "basic" supply which is substantially unaffected by the running conditions, and a "make-up" supply variable with the latter, makes it possible to make certain that this "basic" supply is always provided under a pressure which is constant, and sufficient to ensure good atomization of the fuel at the injection nozzle.

(3) The combination of a low pressure centrifugal pump with a filter and a high pressure gear type pump, a combination which constitutes a constructional unit enabling inadequate filling of the teeth of the gear pump, such as may occur at high altitudes, to be avoided, the fuel being in effect injected between these teeth by the centrifugal pump positioned in front of the gear pump.

The position of the filter 30, on the other hand, enables freezing-up in the gear pump to be avoided.

(4) The regulating apparatus of Fig. 4 enables fuels to be used which are not highly volatile.

What we claim is:

1. In a power plant of the type described, comprising a gas turbine having a rotor, a combustion chamber having a burner for producing gas, arranged to supply said gas turbine with said gas as a motive gas, and means for maintaining a predetermined speed of rotation for said gas turbine rotor, the combination of a source of pressure fuel; means including a valve and flow stabilizing device for conveying a substantially constant, basic flow of pressure fuel from said source to said burner; means including a valve and flow adjusting device for conveying a variable, supplemental amount of pressure fuel from said source to said burner; hand-controlled means for coupling said valves together, adapted to maintain both valves in open position from idle running operation to full throttle running operation; and means responsive to the speed of rotation of said gas turbine rotor for controlling said flow adjusting device.

2. The combination of claim 1, wherein the means for conveying a variable, supplemental amount of pressure fuel comprise a fuel line having a restriction therein, from said source of pressure fuel to said flow adjusting device, said hand-controlled valve included in said means being inserted in said line between said source of pressure fuel and said restriction; and means responsive to the fuel pressure differential across said restriction, for discharging fuel from a point in said line between said hand-controlled valve and said restriction, so as to maintain a substantially uniform flow of pressure fuel in said line past said restriction.

3. In a power plant of the type described comprising a gas turbine having a rotor, a combustion chamber having a burner for producing gas, arranged for supplying said turbine with said gas as a motive gas, and means for maintaining a predetermined speed of rotation for said gas turbine rotor, the combination of a source of pressure fuel; means including a flow stabilizing device for conveying a substantially constant basic flow of pressure fuel from said source to said burner; a fuel distributing device comprising a cylinder having a longitudinal slot of constant width through its wall, a fuel distributing member supported for axial movement in said cylinder and of less axial extent than said slot so as to divide the inner space of said cylinder into two separate chambers of variable volumes; a fuel inlet line from said source to said cylinder arranged to open into said slot; a fuel outlet line from an end of said cylinder to said burner for conveying fuel from one of said chambers to said burner; a fuel discharge line from the other end of said cylinder for discharge of fuel from the other chamber; and means for controlling the position of said fuel distributing member in response to variations of the speed of rotation of said rotor.

4. The combination of claim 3, which further comprises means in said fuel discharge line for controlling the flow of fuel therethrough solely in response to the pressure differential between said chambers.

5. The combination of claim 1, said means for conveying a basic flow of fuel from said source to said burner comprising a fuel line having a restriction therein, from said source to said burner; a spring loaded throttle valve in said line between said source and said restriction for controlling the fuel flow; and means for subjecting said throttle valve to the fuel pressure differential across said restriction.

6. The combination of claim 1, said means for conveying a substantially constant, basic flow of fuel from said source to said burner comprising a fuel line from said source to said burner; a flat diaphragm across said fuel line, having a flow restricting aperture which has a sharp edge; and means sensitive to the fuel pressure differential across said diaphragm aperture, for stabilizing the fuel flow through said line.

7. In a movable power plant of the type described comprising a gas turbine having a rotor, a combustion chamber having a burner for producing gas, arranged for supplying said turbine with said gas as a motive gas, an air compressor coupled with said turbine rotor to be driven thereby and arranged to supply combustion supporting, compressed air to said combustion chamber, means including a governor driven from said turbine rotor for maintaining a predetermined speed of rotation for said rotor, and adjustable means operated from said gas for propelling said movable plant, the combination of a source of pressure fuel; means including a flow stabilizing device for conveying a substantially constant, basic flow of pressure fuel from said source to said burner; a separate fuel conveying line from said source to said burner; means comprising a movable valve in said line, between said source and said burner for discharging a variable amount of fuel from said line; means for controlling said valve from said governor; and means movable in response to pressure differential between two fixed points spaced apart in said compressor, along the path of air therethrough and in response to movement of said movable valve, for adjusting said plant propelling means.

8. In a movable power plant of the type described comprising a gas turbine having a rotor, a combustion chamber having a burner for producing gas, arranged for supplying said turbine with said gas as a motive gas, an air compressor coupled with said turbine rotor to be driven thereby and arranged to supply combustion supporting, compressed air to said combustion chamber, means including a governor driven from said turbine rotor for maintaining a predetermined speed of rotation for said rotor, and adjustable means operated from said gas for propelling said movable plant, the combination of a source of pressure fuel; means including a flow stabilizing device for conveying a substantially constant, basic flow of pressure fuel from said source to said burner; a separate fuel conveying line from said source to said burner; means comprising a movable valve in said line, between said source and said burner for discharging a variable amount of fuel from said line; means for controlling said valve from said governor; means for adjusting said plant propelling means including a rocking lever of variable leverage; means for rocking said lever from said valve; and means responsive to pressure differential across two fixed points spaced apart in said compressor along the path of air therethrough for altering the leverage of said rocking lever.

9. The combination of claim 3, which further comprises means in that portion of said separate fuel line, between said movable valve and said burner, for maintaining a substantially constant, fuel pressure drop in said line portion.

References Cited in the file of this patent

UNITED STATES PATENTS

| Number | Name | Date |
|---|---|---|
| 2,055,587 | Pigott | Sept. 29, 1936 |
| 2,280,835 | Lysholm | Apr. 28, 1942 |
| 2,411,065 | Silvester | Nov. 12, 1946 |
| 2,411,895 | Poole | Dec. 3, 1946 |
| 2,422,808 | Stokes | June 24, 1947 |
| 2,441,948 | Atkinson | May 25, 1948 |
| 2,446,339 | Orr | Aug. 3, 1948 |
| 2,457,595 | Orr | Dec. 28, 1948 |
| 2,500,618 | Pugh | Mar. 14, 1950 |
| 2,506,611 | Neal | May 9, 1950 |
| 2,514,248 | Lombard | July 4, 1950 |
| 2,520,967 | Schmitt | Sept. 5, 1950 |
| 2,536,158 | Chamberlin et al. | Jan. 2, 1951 |
| 2,545,703 | Orr | Mar. 20, 1951 |

FOREIGN PATENTS

| Number | Country | Date |
|---|---|---|
| 587,558 | Great Britain | May 7, 1947 |